Figures 1, 7:
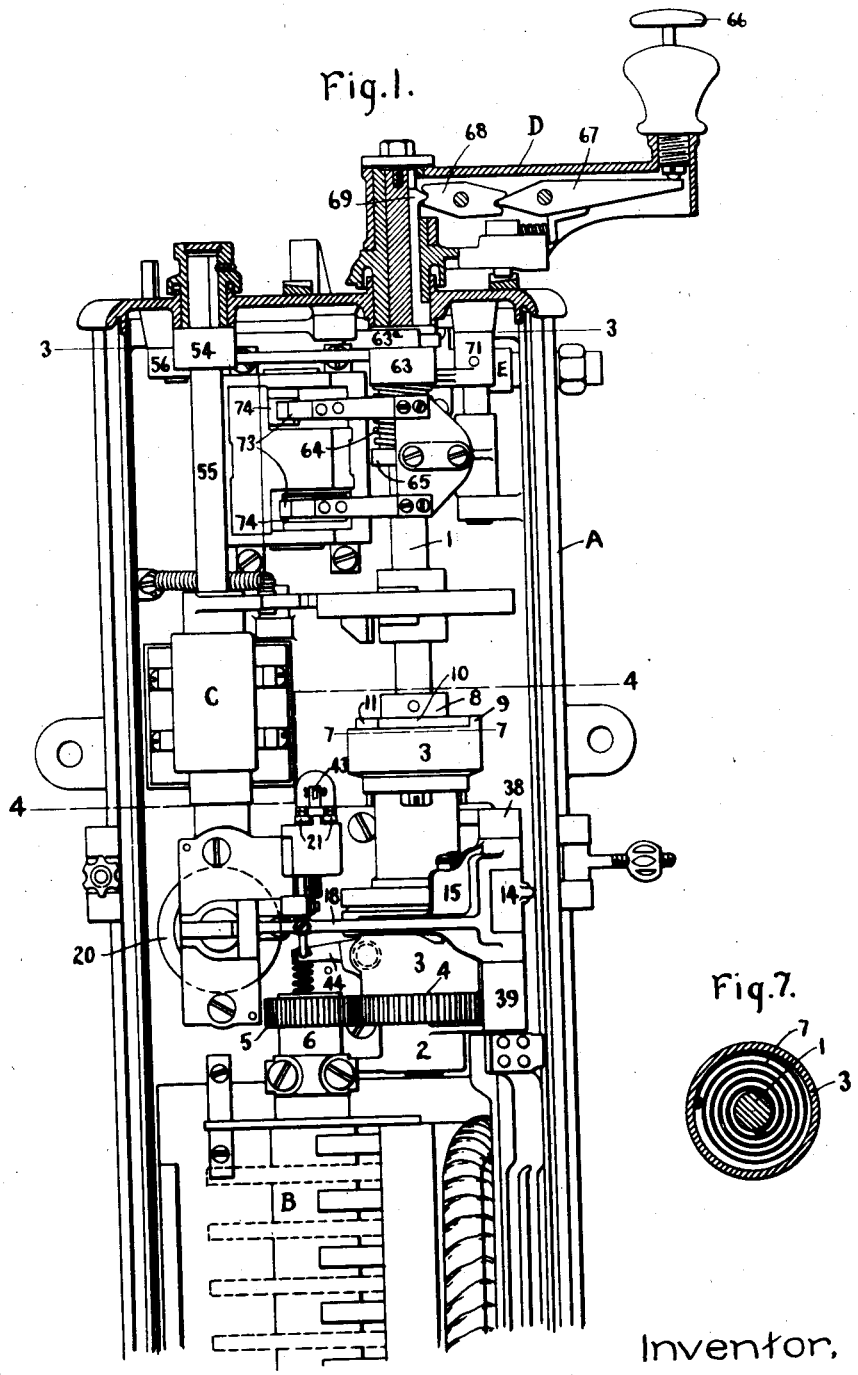

No. 872,991.

PATENTED DEC. 3, 1907.

A. T. CROCKER.
CONTROL APPARATUS.
APPLICATION FILED JAN. 9, 1905. RENEWED SEPT. 18, 1907.

3 SHEETS—SHEET 1.

Witnesses:
Irving E. Steen.

Inventor,
Arthur T. Crocker.
By
Att'y.

No. 872,991. PATENTED DEC. 3, 1907.
A. T. CROCKER.
CONTROL APPARATUS.
APPLICATION FILED JAN. 9, 1905. RENEWED SEPT. 18, 1907.

3 SHEETS—SHEET 2.

Witnesses:
Irving E. Stearns.
Helen Orford

Inventor,
Arthur T. Crocker.
By Albert G. Davis
Atty.

No. 872,991. PATENTED DEC. 3, 1907.
A. T. CROCKER.
CONTROL APPARATUS.
APPLICATION FILED JAN. 9, 1905. RENEWED SEPT. 18, 1907.

3 SHEETS—SHEET 3.

Witnesses:
Irving E. Stern.
Helen Oxford.

Inventor,
Arthur T. Crocker.
By Albert G. Davis
Att'y.

UNITED STATES PATENT OFFICE.

ARTHUR T. CROCKER, OF SCHENECTADY, NEW YORK, ASSIGNOR TO GENERAL ELECTRIC COMPANY, A CORPORATION OF NEW YORK.

CONTROL APPARATUS.

No. 872,991.                Specification of Letters Patent.            Patented Dec. 3, 1907.

Application filed January 9, 1906, Serial No. 240,143. Renewed September 18, 1907. Serial No. 393,462.

*To all whom it may concern:*

Be it known that I, ARTHUR T. CROCKER, a citizen of the United States, residing at Schenectady, county of Schenectady, State of New York, have invented certain new and useful Improvements in Control Apparatus, of which the following is a specification.

The present invention relates to control apparatus for electric motors and particularly to apparatus arranged to produce automatic acceleration of a motor or motors.

In one of its aspects the present invention has for its object to improve the control apparatus set forth in the patent of Frank E. Case, No. 801,214, dated Oct. 10, 1905, for Systems of motor control. In the Case application the master controller, or the motor controller, which is operated directly by the motorman to regulate the motor speed, is so arranged that it is impossible for the motorman to move the controller faster than at a predetermined rate of speed; or to move it at a greater speed, less than the predetermined rate, than that required to accelerate the motors at a predetermined rate of current input. For this purpose the controller is flexibly connected to the operating handle and is provided with a brake or friction device for limiting the forward movement of the controller independently of the movement of the controller handle. By this arrangement the motorman is enabled to turn the controller handle to any running position and the controller proper will follow at a rate of speed determined by the adjustment of the friction or brake device. Further means is provided for entirely checking the forward movement of the controller in case the motor current exceeds a predetermined value.

One of the objects of the present invention is to improve the limiting and checking devices for a motor or master controller of the type specified, in order that a definite current input to the motors may be effectively maintained.

A further object of the present invention is to improve the mechanism for operating the emergency air-brake valve and the emergency circuit breaker when the controller handle is released by the motorman. The construction whereby this object is accomplished is fully shown and described in this application but is not herein claimed as it is made the subject of a divisional application Serial No. 363,585, filed March 21, 1907.

The present invention will be more clearly understood and further objects will appear from the following description and drawings disclosing a preferred form thereof.

Figure 2:
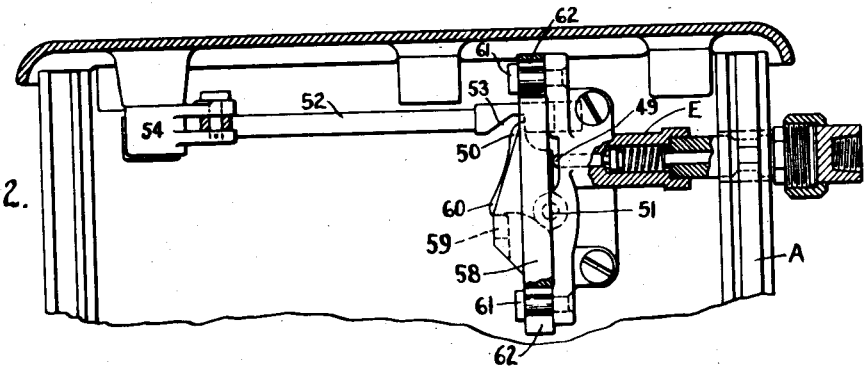
Figure 3:
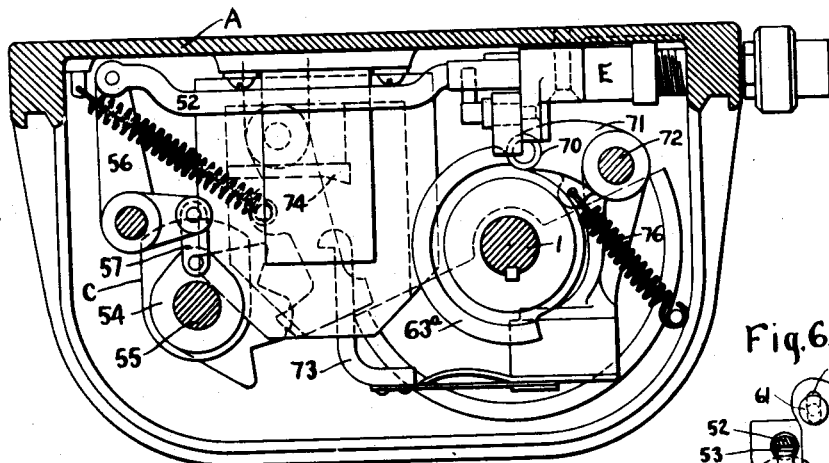
Figure 6:
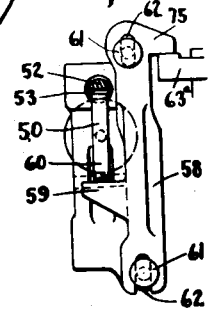
Figure 10:
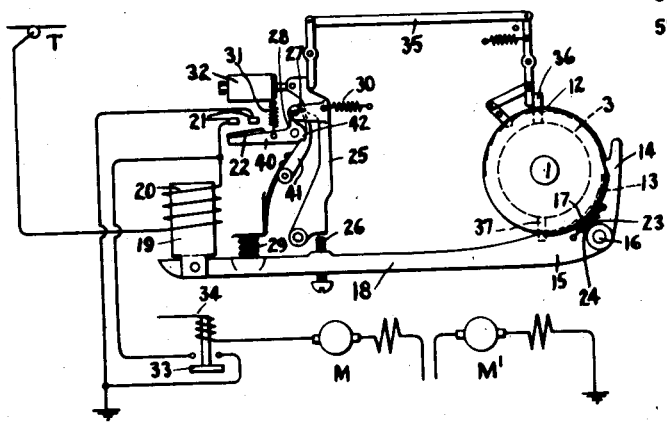
Figure 4:
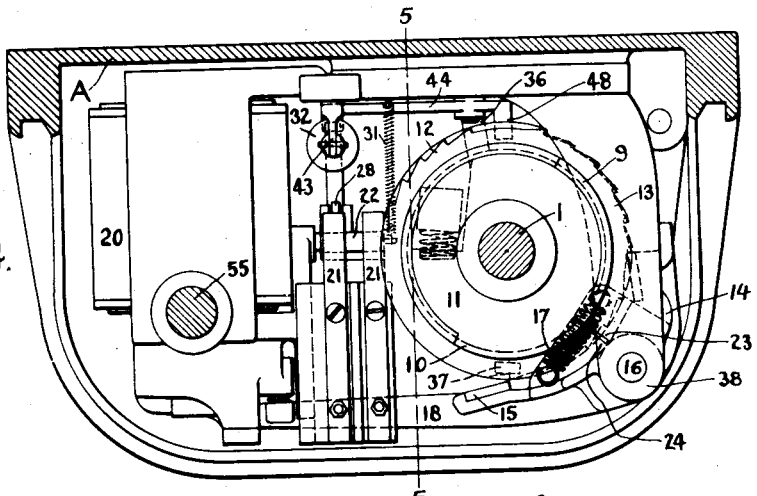
Figure 5:
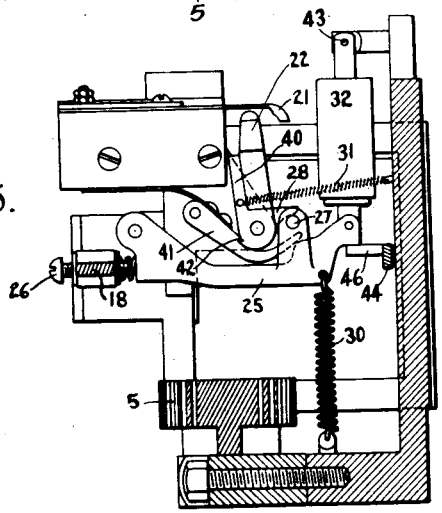
Figure 8:
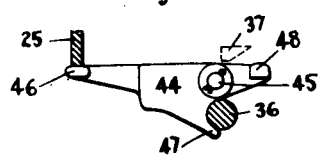
Figure 9:
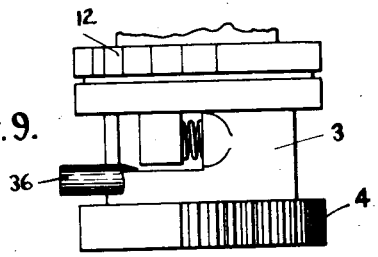

In the accompanying drawings, Figure 1 is a view partly in side elevation and partly in section of a portion of the controller arranged in accordance with the present invention and having a portion of the inclosing casing removed; Fig. 2 is a detail of the upper portion of the controller, parts of which are removed in order to show the mechanism directly associated with the emergency airbrake valve; Fig. 3 is a section taken approximately on line 3 3 of Fig. 1; Fig. 4 is a section taken on line 4 4 of Fig. 1; Fig. 5 is a section taken on line 5 5 of Fig. 4; Fig. 6 is a detail of the mechanism for operating the emergency air-brake valve; Fig. 7 is a section taken on line 7 7 of Fig. 1, showing the yielding connection between the controller shaft and the sleeve geared to the controller cylinder; Figs. 8 and 9 are details of the controller; Fig. 10 is a diagram illustrating, in developed form, the limiting and checking mechanism of the controller.

Similar reference characters will be used throughout the specification and drawings to indicate like parts.

A represents a portion of the controller casing within which are supported the controller parts; B is the controller cylinder; C the reversing switch; and D the controller handle: all of which may be of any usual or desired construction. The controller handle is connected to and directly operates the shaft 1 which extends through the top of the controller casing and is supported at its lower end within the boss 2 adjacent the upper end of the controller cylinder. Surrounding the lower end of the shaft 1 is a sleeve 3, the specific construction of which is immaterial in so far as the operation of the present invention is concerned. The lower end of the sleeve 3, which may be supported upon the boss 2, is provided with gear wheel or segment 4 which meshes with a pinion 5 secured to shaft 6 of the controller cylinder. A spring 7 is arranged within the sleeve 3 and has its opposite ends secured to the shaft 1 and to the walls of the sleeve, respectively. The upper end of the sleeve abuts against a collar 8 upon the shaft 1, and this collar, together with the boss 2, prevents the sleeve from moving axially. The function of the spring 7 is to actuate the controller cylinder when the spring has been wound up or partially wound up by turning the handle to any of its operative positions. In order that it may effectually perform its intended function, the spring is placed under an initial tension which is maintained by reason of the shoulder 9 on the sleeve abutting against a shoulder 10 formed on the flange 11 of the collar 8 when the parts are in their "off" positions. It is evident if no limiting or retarding means were provided, the controller cylinder would operate in substantially the same manner as if it were geared directly to the shaft 1. The preferred form of limiting and retarding means consists of an electromagnetically-actuated escapement device which, under normal conditions, permits the controller cylinder to move forward step by step at a predetermined rate of speed, but which arrests the controller and locks it against movement when the motor current exceeds a predetermined maximum.

In Fig. 10 the limiting and checking mechanism is shown diagrammatically and in developed form and the operation thereof will be described with reference to this figure before the mechanical elements are pointed out in the various figures illustrating the actual controller construction. The sleeve 3 is provided with ratchet teeth 12 and 13 and cooperating with these teeth is a double pawl or pallet comprising the member 14 and the member 15. The members 14 and 15 are mounted upon a common pivot 16 and are connected together by means of a spring 17 which tends to force the shoulders 23 and 24 of the respective pawls or pallets into engagement with each other, causing the members 14 and 15 to act as a single structure in releasing the cylinder, but permitting the member 14 to yield when the cylinder is turned backward. The pallet 15 is provided with an elongated arm 18 which is connected to or otherwise operatively associated with an electromagnet 20. The circuit to the actuating coil of electromagnet 20 from trolley T to ground passes through a set of contacts 21. A movable contact member 22, when in engagement with contacts 21, completes the circuit of the actuating coil of the electromagnet and enables the magnet to lift the end of the arm 18. The shoulders 23 and 24 on the pawls 14 and 15 are so located that one pallet is held out of engagement with the coöperating ratchet teeth when the other pallet is in engagement with the teeth with which it coöperates. In the position of the parts shown, the pallet 14 is in engagement with one of the teeth 12, and, if now the electromagnet 20 is energized, this pallet will be retracted and pallet 15 will be placed in the path of movement of one of the teeth 13, thereby enabling the sleeve 3 to move forward slightly until arrested by reason of the pallet 15 engaging with one of the teeth 13. This movement of the sleeve is sufficient to enable the pallet 14 to ride upon the second of the teeth 12. As the core of the electromagnet 20 rises, a lever 25, which is engaged by a stop 26 on the arm 18, forces the movable contact member 22 out of engagement with the contacts 21 by reason of a pin or projection 27 striking against the arm 28 on the contact member. Thereupon the electromagnet 20 is deënergized and the arm 18 is forced downwardly by means of a spring 29, this movement of the arm 18 releasing pallet 15 from engagement with the teeth 13 and enabling the sleeve 3 to move forward a step until arrested by the pallet 14. As soon as the arm 18 drops, a spring 30 retracts the lever 25 and enables the movable contact member 22 to again come into engagement with the fixed contacts 21. The movable contact member 22 may be gravity actuated or it may be moved to its closed position by a spring 31. The retractile movement of the lever 25 is retarded by means of a dash pot 32 which provides the requisite time interval between successive operations of the electromagnet. In the drawing the movable contact 22 is shown out of engagement with the contacts 21 although the arm 18 is in its lower position; this is due to the action of the locking mechanism for the parts when the controller is in its "off" position as illustrated. The locking mechanism for the escapement will be described hereinafter.

It will be seen that the controller cylinder is moved forward step by step to a point determined by the position of the controller handle, namely, until the shoulders 9 and 10 upon the sleeve 3 and collar 8 upon the controller shaft 1 come into engagement. By adjusting the dash pot, the speed at which the controller cylinder progresses may be varied at will and given any desired value. It may, however, transpire that the particular adjustment which the controller may have, provides for a too rapid increase of current to the motors under some conditions, and I therefore provide means for checking the movement of the controller when the current increases too rapidly, until the current again falls to a normal value. To this end a relay 33 is arrranged in a circuit in shunt to the contacts 21, the coil 34 of the relay being energized by motor current. It is evident that if at any time the current through motors M and $M^1$ reaches a predetermined maximum sufficient to close the relay 33, the circuit of the coil of electromagnet 20 will be closed independently of contacts 21 and 22, and therefore the arm 18 will not drop when contact is broken at 21 but will remain in its raised position until the motor current falls to such a value that the relay is opened. During the time the relay 33 remains closed it is of course impossible for the controller cylinder to move forward, inasmuch as it is held locked by means of the pawl 15.

Unless the escapement mechanism is locked in some way when the controller is in its "off" or in its final running position, the electromagnet will energize and deënergize itself continuously, if current is supplied thereto, producing a useless action of the escapement parts. In order to prevent this, stop mechanism is arranged on the controller for locking the escapement mechanism when the controller cylinder is in either its "off" or its full running position. This stop mechanism may consist of connected lever mechanism 35 which is forced against the lever 25 by pins or projections 36 and 37, arranged upon the sleeve 3 and adapted to engage the lever mechanism 35 when the controller cylinder is in its "off" position and its final running position, respectively.

The parts of the escapement operating mechanism are most clearly shown in Figs. 1, 4, 5 and 8. The electromagnet 20 is arranged within the controller in approximately the same plane as that of the teeth 12 and 13, and the double pawl or pallet device is pivoted between bosses 38 and 39 forming part of or secured to the controller casing. The movable contact piece 22 is provided with an arm 40 to which the spring 31 is attached. A spring-actuated catch 41 is adapted to engage with a shoulder 42 on the arm 40 when the movable contact piece is retracted and thereby hold it in that position independently of the lever 25. The provision of a catch for holding the switch member 22 open enables the lever arm 25 to move freely, subject to the influence of the dash pot, until it approaches the limit of its movement, producing greater certainty of action than if the lever arm had to hold the switch arm open through a sliding engagament between the parts. The dash pot 32 may be of any suitable construction and, as shown most clearly in Figs. 4 and 5, is suspended from the casing at 43. Instead of the lever mechanism 35 shown in the diagram the actual stop mechanism consists of the lever 44 shown most clearly in Figs. 4, 5 and 8. This lever is pivoted at the back of the casing at 45, and is provided at one end with a lug or arm 46 which is adapted to bear against the under side of the lever 25. When the controller is in its "off" position the pin 36 engages with a shoulder 47 on the lever 44 and forces the lug 46 against the under side of the lever 25, thereby preventing the latter lever from being drawn downward. When the controller cylinder is in its full running position the lug 37 rides up over a lug 48 on the lever 44, causing the link 46 to be brought against the under side of lever 25 as before. There is sufficient lost motion in the parts to enable the pin 36 to be withdrawn sufficiently at starting to enable the lever 25 to drop, in order to permit the circuit through electromagnet 20 to be closed.

The emergency air-brake apparatus is as follows: The usual emergency valve E is supported near the top of the controller casing and the valve stem 49 projects slightly beyond the valve casing in the usual manner. A dog 50 is pivotally secured within the controller casing at the point 51 and the end of the stem 49 lies directly within the plane of movement of this dog. When the reverser is in its "off" position the dog 50 is prevented from forcing the valve stem 49 inwardly by means of the arm 52 which is provided at one end with a notch 53 for engaging with the end of dog 50, and is connected at its other end to a collar 54 on the reverser shaft 55 by means of the bell crank lever 56 and the link 57. When the reverser shaft is moved in either direction, in order to give forward or reverse motor connections, bell crank lever 56 is oscillated in a direction to move the rod 52 to the right, releasing the dog 50 from engagement with the walls of the groove or notch 53. A bar or shoe 58 is slidingly mounted adjacent the dog 50 and is provided with a lug 59 which is adapted to engage with a shoulder 60 on the dog when the shoe 58 is moved upwardly, thereby forcing the valve stem 49 inwardly and causing the brake to be applied. A convenient way of mounting the shoe 58 consists in passing rivets or bolts 61 through slots 62 in the dog and securing the rivets or bolts to a fixed part. The shoe 58 is actuated by a sliding cam 63 keyed to the shaft 1. This cam is normally held in its raised position by means of a spring 64 which engages at its respective ends with the cam 63 and a collar 65 on the shaft 1. When the motorman places his hand upon the controller handle he depresses the button 66 and thereby, through the levers 67 and 68, depresses the sliding key 69 which bears at its lower end upon the cam 63, thus pressing the cam downwardly against the action of the spring 65. This movement of the cam brings the cam flange 63ᵃ into alinement with the roller 70 carried upon the end of the arm 71 of the emergency circuit breaker. When the handle of the controller is turned, the cam flange 63ᵃ rotates the arm 71 about its shaft 72, thereby bringing the movable contacts 73 of the emergency circuit breaker into engagement with the fixed contacts 74. If now, while the controller handle is in one of its running positions, the button 66 is released, the cam 63 flies upwardly, striking the shoulder 75 upon the shoe 58 and causing the shoe to press the dog 50 inwardly against the valve stem 49. At the same time the flange 63ᵃ passes beyond the end of the roller 70 and allows the spring 76 to throw the contacts 73 outwardly to break the circuit. This latter operation brings the roller 70 beneath flange 63ᵃ and thus prevents the cam from being moved downwardly to release the brakes until the controller handle is returned to the "off" position when, as shown in Fig. 3, the end of the flange just clears the roller. Therefore in the "off" position of the controller the brakes may be released and applied at will by depressing or releasing the button 66 provided the reverser is in one of its running positions.

Although I have described the present invention in detail as embodied in the best form now known to me, I do not desire to limit it to the particular form illustrated since in its broader aspects, the present invention may be embodied in various forms.

What I claim as new and desire to secure by Letters Patent of the United States, is,—

1. In control apparatus, a controller, an operating handle, a flexible connection between said controller and said operating handle, mechanism for producing a step by step movement of said controller, and electromagnetic means for rendering said mechanism inoperative.

2. In control apparatus, a controller, an operating handle, an electromagnetic escapement for limiting the speed of movement of said controller, and electromagnetic means for rendering said escapement inoperative.

3. In control apparatus, a controller, an operating handle, an electromagnetic escapement for limiting the speed of movement of the said controller, and electromagnetic means for locking said escapement to arrest the movement of the controller.

4. In control apparatus, a controller, an operating handle, a flexible connection between said controller and said operating handle, an escapement for limiting the speed of movement of the said controller, and electromagnetic means for rendering said escapement inoperative.

5. In control apparatus, a controller, means for actuating said controller, an escapement for limiting the rate of movement of said controller, and means for rendering said escapement inoperative when the controller is in its final running position.

6. In control apparatus, a controller, actuating means therefor, an electromagnetic escapement including a switch for limiting the rate of movement of said controller, and means for holding said switch open when the controller is in one of its extreme positions.

7. In control apparatus, a controller, actuating means therefor, an escapement device for limiting the rate of movement of said controller, means independent of the controller actuating means for operating said escapement, and means for rendering said escapement-actuating means inoperative when the controller is in one of its extreme positions.

8. In a control system, a controlled circuit, a controller, an escapement device for limiting the speed of movement of the said controller, and means operated by current in the controlled circuit for rendering said escapement device inoperative.

9. In a control system, a controlled circuit, a controller, an operating handle, a flexible connection between the said controller and the said handle, an escapement device for limiting the speed of movement of said controller, and means operated by current in the controlled circuit for rendering said escapement device inoperative.

10. In control apparatus, a controller, means for moving said controller, a speed limiting device for causing a step by step movement of the controller, and means for locking said speed limiting device to arrest the movement of the controller.

11. In a system of control, a controlled circuit, a controller, means for moving said controller, a speed limiting device for causing a step by step movement of the controller, and means operated by current in the controlled circuit for locking said speed limiting device to arrest the movement of the controller.

12. In control apparatus, a controller, an escapement device for limiting the speed at which said controller may be moved, an electromagnet for governing the operation of the escapement device, and a second electromagnet for governing the operation of the first electromagnet.

13. In control apparatus, a controller, and governing means including an electromagnet for limiting the speed at which said controller may be moved and a second electromagnet for causing the controller to be locked against movement.

14. In control apparatus, a controller, means including an electromagnet for limiting the speed at which the said controller may be moved, a switch in the circuit of said electromagnet, operative connections between said switch and the core of said electromagnet, and a second electromagnet controlling an independent circuit for said first electromagnet.

15. In control apparatus, a controller, means for placing said controller under a strain tending to move it to a running position, and governing means including an electromagnet for limiting the speed at which the controller may be moved and a second electromagnet for causing the movement of the controller to be arrested.

16. In a system of control, a controlled circuit, a controller, means for placing said controller under a strain tending to move it to a running position, and governing means including an electromagnet for limiting the speed at which the controller may be moved and a second electromagnet energized by current in the controlled circuit for causing the movement of the controller to be arrested.

17. In control apparatus, a controller, means for actuating said controller, an escapement for limiting the rate of movement of the controller, an electromagnet for controlling said escapement, a switch in circuit with said electromagnet, and an operative connection between said switch and said electromagnet.

18. In control apparatus, a controller, a speed limiting device therefor including an electromagnet, a switch in the circuit of the electromagnet, means associated with said electromagnet for opening said switch, and means including a dash pot for closing said switch.

19. In control apparatus, a controller, a speed limiting device therefor including an electromagnet, a switch in the circuit of the electromagnet, means associated with the electromagnet for moving said switch in one direction, and means including a retarding device for moving said switch in the other direction.

20. In control apparatus, a controller, and a speed limiting device therefor including an electromagnet and a retarding device for governing the operation of said electromagnet and a second electromagnet for controlling the first electromagnet.

21. In a system of control, a controlled circuit, a controller, and a speed limiting device for said controller including an electromagnet, a retarding device for governing the operation of said electromagnet and a second electromagnet for controlling the first electromagnet.

22. In control apparatus, a controller, means for actuating said controller, an escapement for limiting the rate of movement of said controller, an electromagnet for controlling said escapement, a switch in circuit with said electromagnet, an operative connection between the switch and the escapement for opening said switch, and a retarding device for controlling the opening movement of the switch.

23. In a controller, an operating shaft, a controller cylinder, a sleeve surrounding the said shaft and connected to the controller cylinder, a spring having its ends secured respectively to the shaft and to the sleeve, and an electromagnetic escapement associated with said sleeve for limiting the rate of movement of the controller cylinder.

24. In a system of control, a controlled circuit, a controller, means for actuating said controller, an escapement for limiting the rate of movement of the controller, an electromagnet for governing the operation of said escapement, a switch in the circuit of the electromagnet, an operative connection between said electromagnet and said switch for actuating said switch, a shunt arranged about said switch, a second switch arranged in said shunt, and means controlled by current in the controlled circuit for actuating the said second switch.

In witness whereof, I have hereunto set my hand this 6th day of January, 1905.

ARTHUR T. CROCKER

Witnesses:
BENJAMIN B. HULL,
HELEN ORFORD.